(12) United States Patent
Bessho et al.

(10) Patent No.: US 7,504,070 B2
(45) Date of Patent: Mar. 17, 2009

(54) MICRO REACTOR

(75) Inventors: Yuki Bessho, Aichi (JP); Yukihisa Takeuchi, Aichi (JP)

(73) Assignee: NGK Insulators, Ltd., Nagoya (JP)

( * ) Notice: Subject to any disclaimer, the term of this patent is extended or adjusted under 35 U.S.C. 154(b) by 716 days.

(21) Appl. No.: 10/886,258

(22) Filed: Jul. 6, 2004

(65) Prior Publication Data
US 2005/0008545 A1 Jan. 13, 2005

Related U.S. Application Data

(60) Provisional application No. 60/486,353, filed on Jul. 11, 2003.

(51) Int. Cl.
*B01L 3/00* (2006.01)
(52) U.S. Cl. .......................... 422/99; 422/100; 422/102
(58) Field of Classification Search ................ 422/100, 422/102, 99
See application file for complete search history.

(56) References Cited

U.S. PATENT DOCUMENTS 5,594,292 A * 1/1997 Takeuchi et al. ............ 310/324

6,197,595 B1 * 3/2001 Anderson et al. ........... 436/180

FOREIGN PATENT DOCUMENTS

| JP | 2000-279796 | 10/2000 |
| JP | 2002-085961 | 3/2002 |
| JP | 2003-072061 | 3/2003 |

* cited by examiner

*Primary Examiner*—Jill Warden
*Assistant Examiner*—Natalia Levkovich
(74) *Attorney, Agent, or Firm*—Burr & Brown (57) ABSTRACT

A micro reactor comprising: a first substrate comprising a predetermined number each of micro channels, reactors connected to micro channels at respective connection points, injection ports for feeding/receiving a sample solution, and discharge ports for recovering a sample solution after reaction from respective reactors; and a second substrate in which at least one micro pump is disposed so as to be faced to the injection ports and the discharge ports, the at least one micro pump being provided with a substrate including a cavity made of a ceramic in the inner surface thereof; a piezoelectric/ electrostrictive operation section formed on the outer surface of the substrate, and at least two connection ports for feeding/ receiving a sample solution in the cavity; and the micro reactor being formed integrally by laminating the first substrate and the second substrate.

7 Claims, 7 Drawing Sheets

MICRO REACTOR

CROSS REFERENCE TO RELATED APPLICATION

This application claims the benefit under 35 U.S.C. §119 (e) of U.S. Provisional Application Ser. No. 60/486,353, filed Jul. 11, 2003, the entirety of which is incorporated herein by reference.

BACKGROUND OF THE INVENTION AND THE RELATED ARTS

The present invention relates to a micro reactor for use in a macro fluid device system.

At present, techniques in which reaction, separation, and analysis are carried out by use of a very small amount of solution, have been popular. These techniques include using a micro reactor, a chemical chip, a bio chip, a lab-on-a-chip, and a nano-chip.

Particularly, there has been proposed a technique using a micro reactor for carrying out a large number of biochemical reactions in parallel (see JP-A-10-337173).

This type of the micro reactor is used to conduct chemical reaction experiments in the micro technology field, the development of drugs, the development of artificial internal organs, and is used as a genome/DNA analysis tool, a basic analysis tool of micro fluid engineering and the like.

For the chemical reaction in which the micro reactor is used, for example, since the apparatus itself is quite compact, the apparatus is, as a whole, remarkably high in the thermal efficiency. Therefore, this type of the reactor has such an advantage that the control of temperature can easily be done in a reaction requiring such temperature control. Thus, the temperature control can easily be done even in reactions requiring a precise temperature control, or those requiring a rapid heating or cooling.

Moreover, for the micro reactor, the reaction is carried out in a micro space. For example, in either a liquid/liquid interface between an organic solvent and water or a solid/liquid interface between a liquid and an apparatus wall, a ratio of an area of the interface is very large as compared with a volume of the liquid. Therefore, a movement speed of a molecule is high, and a heterogenous reaction can be carried out with good efficiency.

Furthermore, in the case of the micro reactor, a sample for use in the reaction (reaction reagent, sample or the like) can be reduced in amount and cost since the capacity of the reactor (reaction vessel) is quite minute. Thus, the impact on the environment can be reduced since the reaction scale can be reduced to such an extent of the detection limit of the product.

The major outer shape of the micro-reactor can be formed by merely bonding, with the use of ultrasonic bonding, thermal bonding, press boding, chemical boding, or the like, a substrate on which at least one channel (flow path) and at least a reactor (reaction vessel) are formed to a separately prepared substrate in which at least one injection port, at least one discharge port and the like for a solution are formed.

At this time, the substrates are usually formed of inorganic materials such as silicon, quartz glass, borosilicate glass, and ceramic, or organic materials such as plastics inclusive of polycarbonate, polyacrylamide and the like, silicone rubbers, silicone resins, and the like.

Moreover, a predetermined number of the micro channels (flow path) and/or the reactors (reaction vessel) is formed on the substrate by chemical treatments such as dry etching and wet etching, or energy ray treatments such as laser, atom beam, and ion beam. Furthermore, in the case that the micro reactor is made of plastic, the substrate can be also produced by the injection molding method wherein a molten resin is injected into a mold having a predetermined number of the convex portions corresponding to the channels to be formed. The width of each channel (flow path) may vary, depending upon the application field thereof, but is usually within about 40 to 500 μm. However, one may sometimes employ the width of from about 2 to 40 μm for the micro channels, depending upon its application field or the like. It is to be noted that the depth of the channel (flow path) is usually within a range of from 0.6 to 500 μm.

As described above, since the volumetric size of the channel (flow path) or the reactor (reaction vessel) is quite minute, the special precautions are required when the molecules are handled, compared with the case wherein the molecules are handled in the usual reaction container. For example, in case of the micro reactors conventionally used, a sample solution is mainly fed to the channel(s) (flow path(s)) or the reactor(s) (reaction vessel(s)) by the solution feeding means such as a micro pump, electro-phoresis and the like. However, it is difficult to control precisely and rapidly the flow rate of the solution feeding means, and increase or decrease precisely and rapidly the discharge amount of a sample solution and the like. This is because the minute and complicated channels are provided in the case of the micro reactors conventionally used. Especially, when the conventional micro pump is used practically, one often faces to such a difficulty that the resonance frequency of the pump cannot be sufficiently raised, wobbles easily occur during the operation in the pump structure, or the like. This is because the rigidity of the pump structure is not sufficiently high since the driving section of the pump is made independently from the cavity section for the pump. Therefore, when the solution in the channels, or the solid as the case may be, is transported or vibrated (generically driven), the transport of the solution can not be performed at a high speed, or the vibration of the solid at a high frequency.

Moreover, when a plurality of solution feeding means are integrated in the micro reactor, the required number of solution feeding means are individually attached. Therefore, there have been problems that an integration ratio is not high and that productivity is poor.

The present invention has been made in view of the problems mentioned above. Thus, the object thereof is to provide a micro reactor superior in the productivity and the usability for the general use. The micro reactor may be manufactured by preparing the micro pump unit being provided with an integrally formed plural number of micro pumps superior in discharging force into the channels (flow paths) and being capable of instantly controlling feeding/receiving of a solution with precise accuracy, and a reactor unit mainly provided with a plural number of the channels (flow paths), a plural number of the reactors (reaction vessels) including injection ports, and discharge ports, independently; and laminate-bonding them each other to obtain the micro reactor.

SUMMARY OF THE INVENTION

According to the present invention, there is provided a micro reactor comprising a first substrate and a second substrate. The first substrate comprises a predetermined number of micro channels, a predetermined number of reactors connected to micro channels at respective connection points, a predetermined number of injection ports for feeding/receiving a sample solution, and a predetermined number of discharge ports for recovering a sample solution after reaction from the respective reactors, the injection ports and the discharge ports being disposed in corresponding micro channels or corresponding reactors connected to corresponding micro channels; and a second substrate in which at least one micro pump is integrally formed; the first substrate and the second substrate being integrally bonded in such a manner that the injection ports and/or the discharge ports are faced at respective positions, wherein the micro pump comprises: a substrate including a cavity made of a ceramic in the inner surface of the substrate; a piezoelectric/electrostrictive operation section including an electrode and a piezoelectric/electrostrictive layer formed on the outer surface of the substrate; and at least two connection ports for feeding/receiving a sample solution in the cavity with a pressure generated in the cavity by the piezoelectric/electrostrictive operation section. The piezoelectric/electrostrictive layer is preferably formed by film forming method.

In the present invention, one may preferably use a standardized substrate wherein the portions usable for forming injection ports and/or the discharge ports have been disposed beforehand at predetermined positions as a first substrate.

Moreover, in the present invention, the number of micro pumps disposed in the second substrate may be larger than that of injection ports and/or discharge ports of the first substrate, and the second substrate may have at least two micro pumps connected each other as a micro pump.

Furthermore, in the present embodiment, the second substrate is preferably bonded to the whole surface or a part of the first substrate. Here, a thickness of a bonded interface portion between the first and second substrates is preferably 0.1 to 10 μm.

It is to be noted that in the present invention, a material of the first substrate is preferably plastic, and that of the second substrate is ceramic. Moreover, the materials of the first and second substrates may also be ceramic.

BRIEF DESCRIPTION OF THE DRAWINGS

FIGS. 4(a), (b) show one example of a micro pump unit of the present invention.

FIGS. 5(a), (b), (c) show another example of the micro pump unit of the present invention.

FIGS. 7(a), (b) are schematically sectional views showing examples of the micro pump of the present invention, FIG. 7(a) shows the present invention.

DESCRIPTION OF THE PREFERRED EMBODIMENT

In a micro reactor of the present invention, a first substrate includes a plural number of micro channels, a plural number of reactors connected to respective micro channels, a plural number of injection ports for feeding/receiving a sample solution, and a plural number of discharge ports for recovering the sample solution after reaction from the reactors. The injection port(s) and the discharge port(s) are disposed in the micro channel(s) or the reactor(s) connected to the micro channels. A second substrate in which at least one micro pump are integrally formed is integrally bonded to the first substrate in such a manner that the injection port and/or the discharge port are faced each other. The micro pump includes: a substrate including a cavity formed of a ceramic in the inner surface of the substrate; a piezoelectric/electrostrictive operation section including an electrode and a piezoelectric/electrostrictive layer formed on the outer surface of the substrate by a film forming method; and at least two connection ports for feeding/receiving the sample solution in the cavity with a pressure generated in the cavity by the piezoelectric/electrostrictive operation section.

The one of major characteristics of the micro reactor of the present invention lies in the employment of integrally formed ceramic micro pump formed in the second substrate (micro pump unit). Accordingly, there is no need to attach each of the predetermined number of micro pumps to the predetermined positions one by one, the process of which would require precise assembly. Thus, one may employ tape molding/mold punching for the formation of a ceramic substrate, and film forming method such as printing, sputtering, and the like for the formation of piezoelectric/electrostrictive members or electrodes. Moreover, a large number of pumps can be formed on the substrate at once, and, therefore, the present invention is suitable for mass production.

Moreover, another one of major characteristics of the micro reactor of the present invention is the use of a plastic for the first substrate (reactor unit). Accordingly, for the first substrate (reactor unit) of the present invention, hydrophilic biological materials such as DNA are not adsorbed by the surface of the flow paths (channels) or reaction vessels (reactors). Therefore, the present invention is suitable for handling such materials. Neither the blocking of the flow paths (channels), nor obstruction of the sample flow can be seen. The present invention is also suitable for mass production.

Furthermore, another one of the major characteristics of the micro reactor of the present invention lies in the fact that one may cope with the manufacturing of a various kind of the final products in a relatively small quantity. This is because one may manufacture the intended micro reactor by merely combining the mass-produced first substrates (reactor units) and second substrates (micro pump units). In this case, one may use a standardized substrate wherein positions of the predetermined number of the injection ports and/or the discharge ports are formed beforehand in the first substrate. The second substrate (micro pump unit) includes micro pumps whose number is larger than that of injection ports and/or discharge ports of the first substrate. Therefore, even when the design of the substrates should be changed, depending upon the design of the micro reactor to be produced (e.g., a reaction system is changed), the change in the design can easily be made.

As described above, in case of the micro reactor of the present invention, it is possible to integrate highly a great number of micro pumps superior in discharge force into the channels (flow paths) having the width of 2 to 500 μm (especially, 2 to 40 μM), and capable of instantaneously controlling the feeding/receiving of a solution with high precision. Furthermore, it is possible to produce the present micro reactor by manufacturing independently a micro pump unit in which the micro pumps are integrally formed, and a reactor unit being provided with mainly the micro channels, the reactor(s) (reaction vessel(s)), and the corresponding injection port(s) and corresponding discharge port(s), and bonding together thus manufactured micro pump unit and reactor unit. Accordingly, the present micro reactor is superior in the productivity and the usability for the general use.

Figure 1:
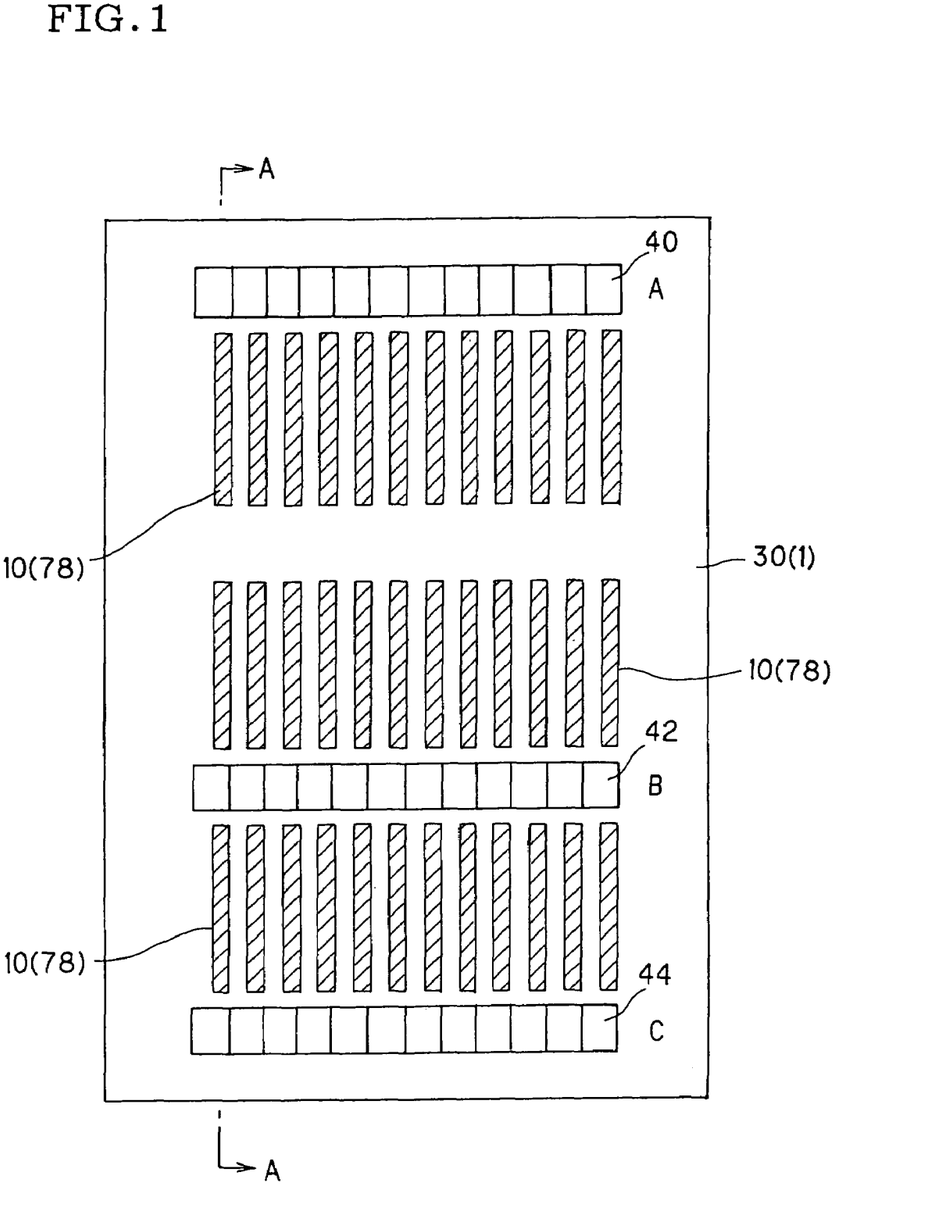
FIG. 1 is a front view showing one example of a micro reactor of the present invention.
Figure 2:
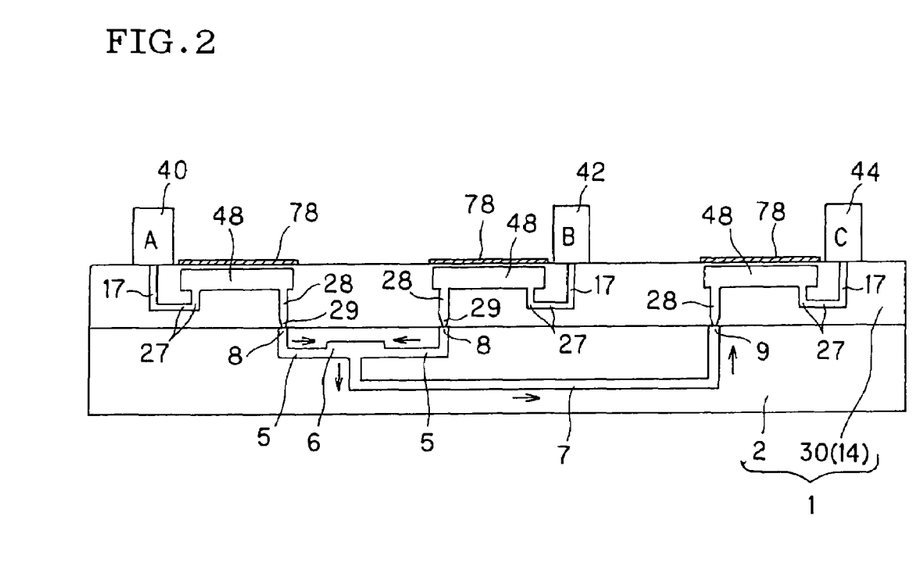
FIG. 2 is an A-A sectional view of FIG. 1.

An embodiment of the present invention will be described hereinafter in detail with reference to the drawings. FIG. 1 is a front view showing one example of the micro reactor of the present invention, and FIG. 2 is an A-A sectional view of FIG. 1. For the micro reactor of the present invention, as shown in FIGS. 1 and 2, a first substrate 2 includes at least two flow paths (micro channels) 5, 7, at least one reactor 6 connected to the flow path 5, at least one injection port 8 for feeding/receiving a sample solution, and at least one discharge port 9 for recovering the sample solution from the reactor 6 after the reaction. Each of injection and discharge ports is disposed in the flow paths 5, 7 or the reactor 6 connected to the flow paths. A second substrate 30 (micro reactor unit 14) in which at least one micro pump 10 is integrally formed is bonded to the first substrate in such a manner that the injection port(s) 8 and/or the discharge port(s) 9 are facing each other, thereby the micro reactor is integrated. It is to be noted that the micro reactor unit 14 includes at least two storage tanks 40, 42 for supplying the sample to the micro pumps 10, and at least one recovery tank 44 for recovering the sample from the reactor 6.

As is shown in FIG. 2, the first substrate 2 (reactor unit) of the present invention may have two flow paths 5, a reactor 6 connected to the flow paths 5, and two injection ports 8 for feeding and receiving a sample solution and a discharge port 9 for recovering the sample from the reactor 6 after the reaction in one row along the longitudinal direction of the substrate 2. Each of the injection ports 8 may be disposed at each end of the flow paths 5 and connected to the reactor 6 connected via the flow paths 5.

In this case, it is preferable to design a standardized first substrate of the present invention to dispose, in advance, the portions to which the injection port(s) 8 and/or the discharge port(s) 9 are formed when the present micro reactor 1 is assembled. It is to be noted that the portions to which the injection port(s) 8 and/or the discharge port(s) 9 are formed when the present micro reactor is assembled means, for example, the predetermined positions to which the injection port(s) 8 and/or the discharge port(s) 9 will be formed when the present micro reactor is assembled. Furthermore, if it is decided to dispose the injection port(s) 8 and/or the discharge port(s) 9 at the predetermined positions, it is preferable to mark such positions in order to facilitate the next assembly step.

It is to be noted that the material of the first substrate 2 is preferably formed of plastic. This is because the surface of the substrate 2 made of plastic is usually hydrophobic, hydrophilic biological materials such as DNA are not adsorbed by the surface, unless the plastic is subjected to surface treatment. That is, such property as a substrate is suitable for the handling of such materials. The first substrate 2 of the present invention is not especially limited, but is preferably formed of polymethyl methacrylate (PMMA) or polycarbonate (PC).

Moreover, the first substrate 2 may also be formed of ceramics such as silicon, glass, and alumina in addition to zirconia. In this case, it is important to modify the inner surface of the formed flow paths 5, 7 or reactors 6 to make them hydrophobic. As reasons for the above, in general, an OH group appears as a terminal end group on the surface of ceramic in many cases, and it is known that hydrophilic properties are high. When the biological materials such as DNA are handled, the biological materials are easily adsorbed by the ceramic surface by chemical affinity due to the hydrophilic property. An influence of adsorption in a micro flow path 5, 7 is relatively high because a flow path 5, 7 diameter is small. Therefore, the flow is obstructed, and in an extreme case, the flow path 5, 7 is sometimes blocked.

Next, a method of forming the flow path 5, 7 (groove) of the first substrate 2 of the present invention will be described in detail.

(1) When the material of the substrate 2 is a ceramic, the flow paths are formed as follows: firstly, a ceramic sheet is punched/processed to form slits, and then this ceramic sheet is laminated in such a manner that this sheet is sandwiched by other ceramic sheets so as to form the flow paths 5, 7.

(2) When the material of the substrate 2 is glass or silicon, the flow paths 5, 7 can be formed by isotropic or anisotropic etching.

(3) The flow paths 5, 7 may also be formed in the substrate 2 by laser processing.

(4) A part of the flow paths 5, 7 may be formed by subjecting a substrate 2 to mechanical processing (machining) by the use of an end mill to form the groove as a part of the flow paths.

(5) A part of the flow paths 5, 7 may be also formed by sandblasting a substrate to form a predetermined number of the grooves constituting a part of the flow paths 5, 7.

(6) A part of the flow paths 5, 7 may be also formed by pressing a hot mold having concave/convex portions onto the surface of the substrate to emboss a predetermined number of grooves constituting a part of the flow paths 5, 7.

(7) The flow paths 5, 7 may also be formed in the substrate by precise injection molding.

When the predetermined number of grooves is formed by the use of the above-described machining processing (4) or sand blasting (5), a processing damage called a micro crack is apt to be formed at the corner portion of the groove, and a crack is developed from the micro crack as a start point, and the substrate 2 (base material) is sometimes broken due to the crack. Because a residual stress is sometimes generated in the base material, it is desirable to use the following countermeasures against this problem.

(Crack Restraining Method)

(1) The substrate 2 is subjected to a healing treatment (thermal treatment, annealing treatment), the micro crack generated in the surface is sealed (eliminated), and the residual stress is released.

(2) A coating layer is applied on the surface of the grooves, and the crack is coated and sealed by the coating layer. More concretely, the coating layer is formed on the surface of the grooves by dipping the substrate 2 into an ultraviolet hardening type acrylic resin having high fluidity. Then, an excess amount of the acrylic resin used to fill the cracks is removed by compressed air or by the use of a spin coater before the acrylic resin is hardened. When the coating layer is irradiated with an ultraviolet ray to cure the coating layer, the acrylic resin penetrates into the cracks, and a smooth groove surface is formed.

Moreover, for the first substrate 2 of the present invention, the surface of the grooves may also be coated with a material having a coefficient of thermal expansion which is smaller than that of the substrate. Accordingly, since a compression stress is applied to the groove surface, the development of the crack can be prevented.

Furthermore, the first substrate 2 of the present invention may also be coated with Teflon (a registered trademark) by the use of a sputtering method, which is a surface coating method.

Accordingly, the moving speed of the member to be moved may also be raised by the Teflon (a registered trademark) coating layer.

Next, for example, as shown in FIGS. 1 and 2, the micro pump unit 14 in which a plurality of micro pumps 10 are integrally formed is used as a second substrate 30 of the present invention. Accordingly, it is possible to collectively attach the present second substrate 30 to the present first substrate 2 in accordance with patterns of the injection ports and/or the discharge ports of the first substrate.

Figure 4A:
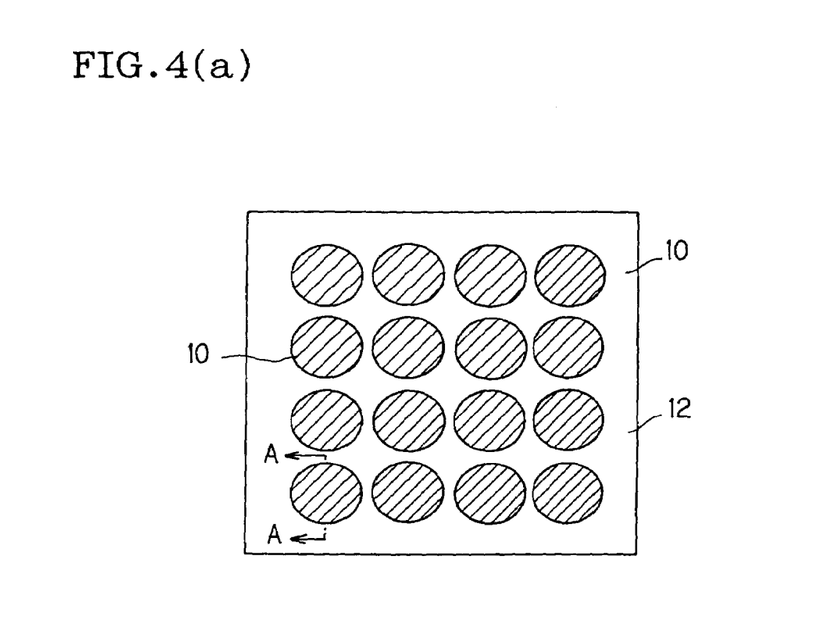
FIG. 4(a) is a front view.
Figure 4B:
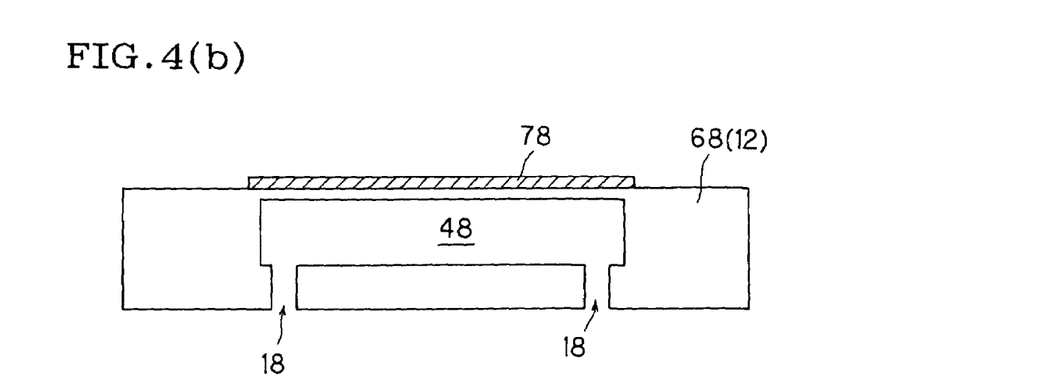
FIG. 4(b) is an A-A sectional view of FIG. 4(a)
Figure 5A:
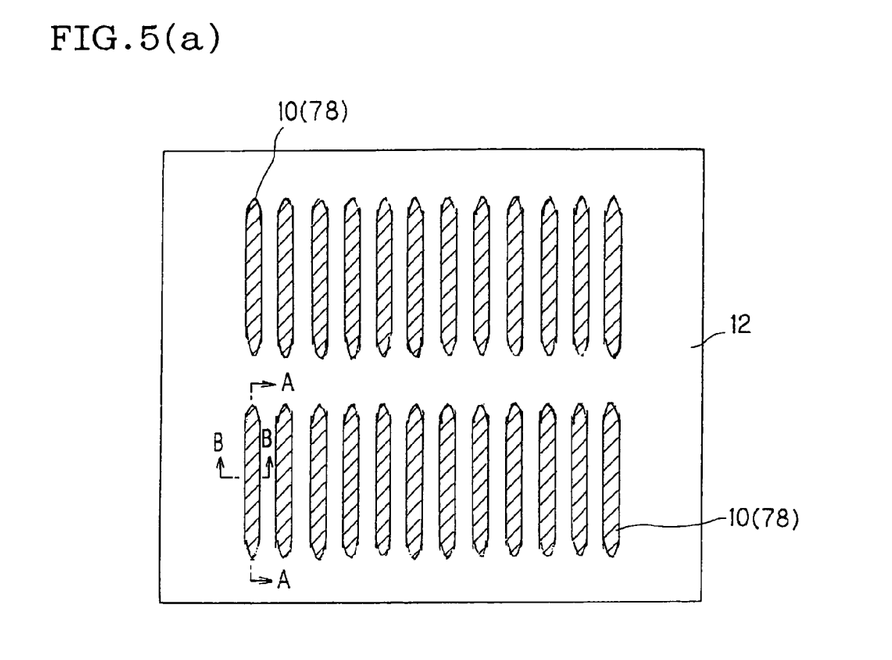
FIG. 5(a) is a front view.
Figure 5B:
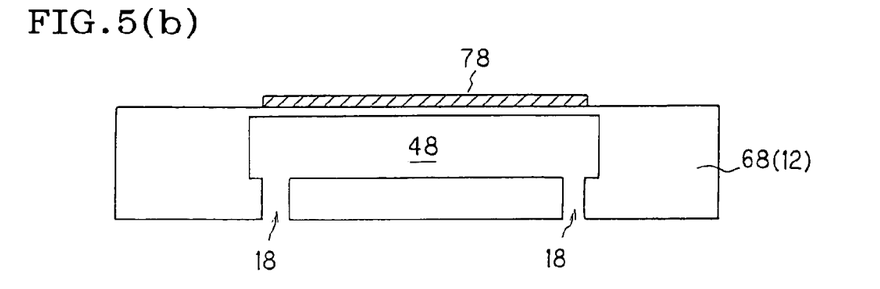
FIG. 5(b) is an A-A sectional view of FIG. 5(a)
Figure 5C:
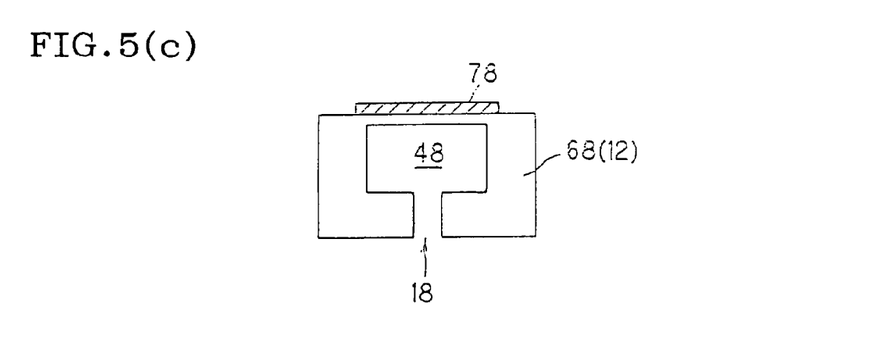
FIG. 5(c) is a B-B sectional view of FIG. 5(a)

Moreover, the shape and arrangement of the micro pumps 10 in the micro pump unit 14 of the present invention are not especially limited. For example, the circular micro pumps 10 may be arranged lengthwise and crosswise as shown in FIGS. 4(a), (b), or substantially the elliptic micro pumps 10 may be arranged lengthwise and crosswise as shown in FIGS. 5(a), (b), (c). That is, for the micro pump unit 14 of the present invention, it is easy to change the shape and arrangement of the micro pumps 10 in accordance with performance or design of the micro pumps 10, and a plurality of micro pumps 10 can easily be integrated.

Furthermore, the micro pump unit 14 of the present invention may also include micro pumps 10, the number of which is larger than that of injection ports 8 and/or discharge ports 9 of the first substrate 2, or a micro pump 10 connected to at least two or more micro pumps 10. Accordingly, with the second substrate 30 (micro pump unit) of the present invention, even the change of the arrangement of the injection ports 8 and/or the discharge ports 9 of the first substrate 2 by the design change can easily be managed. Moreover, a discharge amount of the micro pump 10 can be freely adjusted (e.g., when the existing micro pump 10 formed in the micro pump unit is connected to a support unit (described later)).

Figure 6:
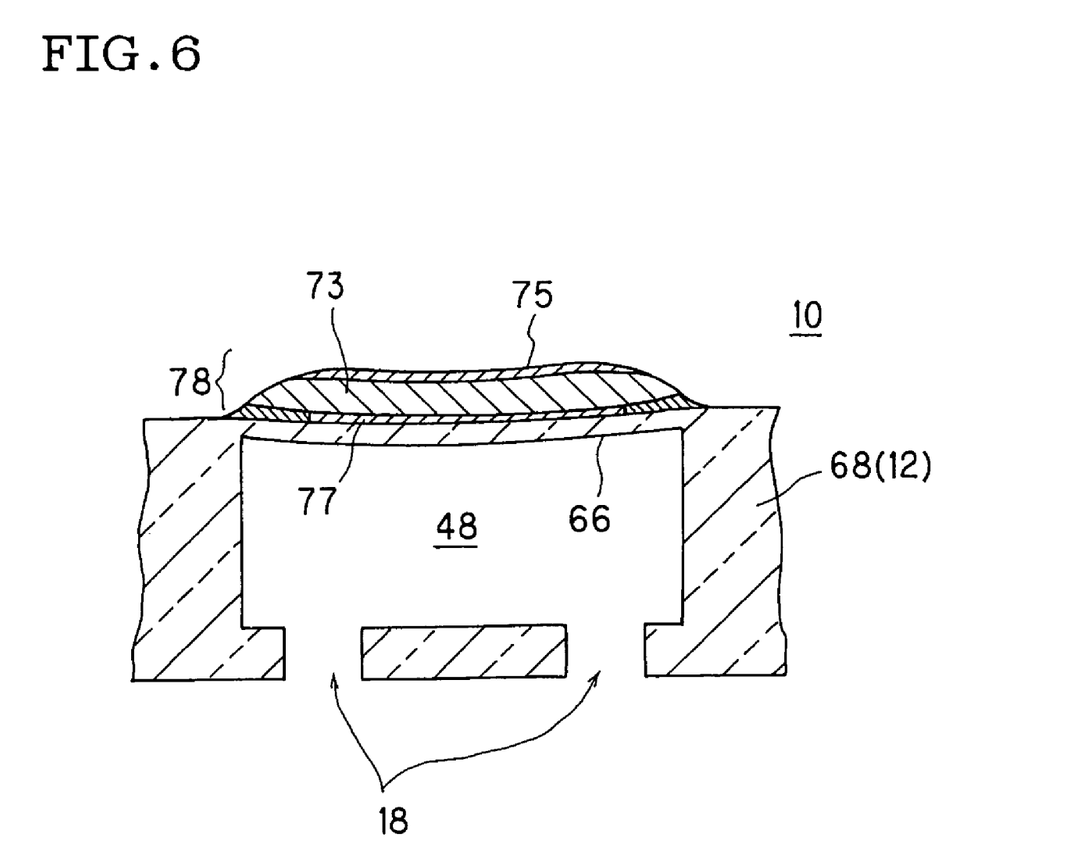
FIG. 6 is a vertically sectional explanatory view showing one example of a micro pump of the present invention.

Here, as shown in FIG. 6, the micro pump 10 of the present invention includes: a substrate 68 including a cavity 48 made of a ceramic in the inner surface of the substrate 68; a piezoelectric/electrostrictive operation section 78 including electrodes 75, 77 and a piezoelectric/electrostrictive layer 73 formed on the outer surface (vibrating section 66) of the substrate 12 by a film forming method; and at least two or more connection ports 8, 9 for feeding/receiving the sample solution in the cavity 48 with a pressure generated in the cavity 48 by the piezoelectric/electrostrictive operation section 78.

Next, for the micro reactor 6 of the present invention, the second substrate 2 is preferably bonded to the whole surface (see FIG. 1) or a part (not shown) of the first substrate 2, and integrated. Especially, when a size of the second substrate 30 is set to a minimum size required for installation of the micro pumps 10, the detection of chemical reaction from the first substrate 2 (reactor unit) or photochemical reaction is preferably prevented from being obstructed. Moreover, in the micro reactor 6 of the present invention, through holes may be appropriately disposed in the second substrate 30 not to hinder the optical detection.

For the second substrate 30 of the present invention, the micro pumps 10 are preferably disposed beforehand in some or all of positions where the injection ports 8 and/or the discharge ports 9 of the first substrate 2 can be disposed. The second substrate 30 may also include more micro pumps 10 than the injection ports 8 and/or the discharge ports 9 of the first substrate. Changing the design of the pattern of the channels 5,7 (flow paths) or the reactors 6 (reaction vessels) can flexibly make the modification of the installation positions of the injection ports 8 or the discharge ports 9. The second substrate 30 can be flexibly coped with first substrate 2 (reactor unit) of various numbers, as well.

Figure 7A:
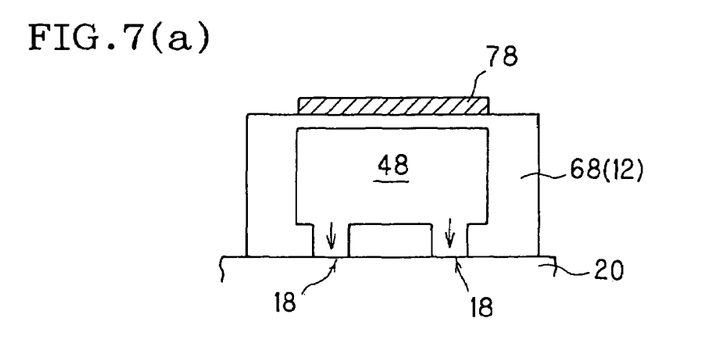
FIG. 7(b) shows a related art.

Here, in another micro pump 10 of the present invention, for example, as shown in FIG. 7(a), when a micro pump unit 12 is bonded to a support unit 20, only a force corresponding to sectional areas of the connection ports 18×pressure is applied to a bonded portion. Therefore, a force for tearing the substrates 12, 20 from each other generated at a time of the driving of the micro pump 10 can be largely reduced, it is possible to minimize a bonding material (e.g., adhesive) constituting an interface portion between the substrates 12, 20, and the substrates 12, 20 can be more securely integrated.

Figure 7B:
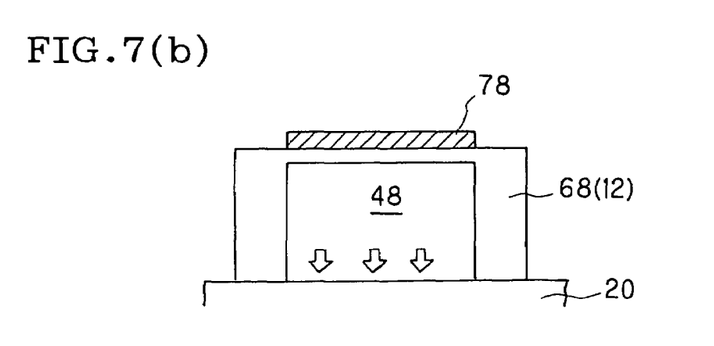

On the other hand, in a conventional micro pump, for example, as shown in FIG. 7(b), when the micro pump unit 12 is bonded to the support unit 20, the bonded portion is directly defined by the cavity 48. Therefore, when the micro pumps 10 are driven, the pressure inside the cavity 48 is increased, the pressure is transmitted to the whole sectional area of the cavity 48 (contact portion with the support unit 20), and therefore the tearing force applied to the bonded portion is very large. The area of the bonded portion between the substrates should be increased in order to impart a sufficient strength to the bonded portion thereof. However, it is difficult to integrate the substrates, and there is also a problem that sufficient durability cannot be attained.

Moreover, the micro pump 10 of the present invention has a ceramic integral structure, and is high in rigidity. Even when a large discharge force is generated, the durability is superior, and additionally the sample solution can be fed/received without losing any pressure. Therefore, the micro pump 10 of the present invention is preferably usable even in a case where the necessary discharging force is required to apply to the sample in order to make it pass through the micro channels 5, 7 (flow paths) having such a very smaller width of 2 to 40 μm.

Further in the micro pump 10 of the present invention, when the piezoelectric/electrostrictive member 78 is instantaneously deformed in response to a voltage signal, a capacity in the pump 10 is instantaneously changed, and the discharge force can be generated. Therefore, a plurality of micro pumps 10 capable of feeding/receiving the solution can be controlled with high precision and collectively.

It is to be noted that the micro pump 10 of the present invention is preferably usable also in the following applications.

(1) Hybridization of DNA Micro Array

When the micro pump 10 of the present invention is used for promoting hybridization reaction of a DNA micro array, a hybridization solution of the micro array can be stirred in the micro channels, and therefore a hybridization time can be largely reduced.

Here, since the micro pump 10 of the present invention is a ceramic integral pump having high rigidity, it is possible to drive (vibrate) the pump 10 at a high speed. Accordingly, since the micro pump 10 of the present invention is capable of generating a flow of water at a high speed in the micro channels 5,7 to promote the stirring of a liquid phase, the localization of molecules can be eliminated even with micro stirring. This cannot be achieved only with usual molecule diffusion. Moreover, since the inner volume of the micro channel 5,7 can be reduced, there is an advantage that only the use of hybridization solution in a small amount is sufficient.

Moreover, since the micro pump 10 of the present invention is also capable of spraying the solution into the micro channels 5,7 for performing the hybridization, the hybridization reaction can also be promoted by the water flow at the high speed.

Therefore, when the micro pump 10 of the present invention is applied to the DNA micro array, a hybridization efficiency increases by the promotion of the reaction, a fluorescent intensity increases, and this can largely contribute to reduction of cost and enhancement of reliability of data.

(2) Liquid Chromatography (High-Speed Liquid Chromatography [HPLC])

The micro pump 10 of the present invention is usable as the pump for micro HPLC capable of analyzing a quite smaller amount of components by the use of the micro channels 5, 7 formed on the chip. It is to be noted that the micro pump 10 of the present invention is disposed between a (high-pressure) solution feed pump capable of feeding a steady flow and the micro channels 5, 7.

Here, since the micro pump 10 of the present invention is the ceramic integral pump having the high rigidity, the frequency of a voltage pulse signal applied to the piezoelectric/electrostrictive member 78 (piezoelectric/electrostrictive operation section) is changed, and accordingly the modulation with vibration can be given to the fed solution flow. It is to be noted that, in the present invention, the piezoelectric/electro-strictive member 78 of a film type is especially preferable in accordance with the manufacturing cost or a degree of integration. Needless to say, the present invention is not limited to this member. The member 78 of a type other than the film type can be applied to applications in which the hybridization reaction is used, such as DNA micro array, or the liquid chromatography. Here, a section other than the piezoelectric/electrostrictive operation section may also be disposed in consideration of the application in which the hybridization reaction is used or the application to the liquid chromatography. That is, in this case, the first substrate 2 includes: a predetermined number of the flow paths 5,7 including predetermined number of the micro channels; a predetermined number of the reactors 6 connected to at least to the individual predetermined flow paths 5,7; and a predetermined number of the injection ports 8 for feeding/receiving a sample solution and a predetermined number of the discharge ports 9 for recovering the sample solution from the reactor when the reaction is over. The second substrate 30 in which at least one or more micro pumps 10 are integrally formed is bonded and integrated with respect to the first substrate 2 so as to face the injection ports 8 and/or the discharge ports 9. The micro pump 10 may include: the substrate 30 including the cavity formed of ceramic in the inner surface; pressure applying means 78 disposed on the outer surface of the substrate; and at least two connection ports 8,9 through which a sample solution is fed/received in the cavity 48 with the pressure generated in the cavity 48 by the pressure applying means 78. Here, the pressure applying means 78 is, for example, the piezoelectric/electrostrictive member, and the piezoelectric/electrostrictive layer of the film type is more preferable, but the present invention is not limited to the layer. For example, a bulk piezoelectric/electrostrictive member including a multilayered structure, or means in which an electrostatic force, a magnetic force, or thermal expansion by the heating of gas is used may also be used.

For example, when a material to be analyzed is macromolecular, a resonance phenomenon occurs in accordance with frequency of applied vibration by the use of the micro pump 10 of the present invention. The speed of the macromolecule flowing in a column changes with a physical shape of the macromolecule, an adsorption/desorption speed in the column is modulated, and it is possible to separate the macromolecules which have not heretofore been separated with a slight difference in molecular structure.

Moreover, with the use of the micro pump 10 of the present invention, for example, when the material to be analyzed is macromolecular, the fed solution flow is modulated, and accordingly a difference can be made in the flowing speed in the micro channel 5,7 by the macromolecular structure. Therefore, it is possible to precisely separate the macromolecules by the use of this speed difference.

It is to be noted that the high-speed liquid chromatography (HPLC) means a liquid chromatography in which the column filled with a fixed phase having a micro particle diameter is used and the solution of a moving phase is fed at a high pressure in a chromatography method to separate components in a mixture from each other by a difference of an interaction between the stationary phase and the mobile phase. The chromatography is high in degree of separation and short in analysis time.

Next, a method of preparing the micro pump unit 10 will be described in detail with reference to FIG. 6. First, a substrate layer (in which the connection ports 18 are disposed), spacer layer (in which the cavity 48 is disposed), and thin plate layer (constituting the vibrating section 66), which are formed of a ceramic raw material, are stacked/integrated in order. Accordingly, the substrate 68 in which the cavity 48 and connection ports 18 are formed in predetermined positions is prepared.

It is to be noted that the material of the micro pump unit 10 of the present invention is not especially limited, but zirconium oxide whose crystal phase is partially or completely stabilized by a predetermined compound is preferably used as a main component.

Accordingly, in the micro pump unit 10, mechanical strength and tenacity can be advantageously secured even in a small plate thickness, large displacement is attained with a relatively low operation voltage, and further a high response speed and a large generated force can be attained.

It is to be noted that "partially or completely stabilized zirconium oxide" contains zirconium oxide whose crystal layer is partially or completely stabilized so as to prevent crystal transformation from being partially or completely caused at a time when heat, stress or the like is applied.

Examples of a compound which stabilizes zirconium oxide include yttrium oxide, cerium oxide, magnesium oxide, and calcium oxide. When at least one of the compounds is added or contained alone or as a combination, zirconium oxide is partially or completely stabilized.

Furthermore, a content of the added compound is preferably set to 2 mol % to 7 mol % with respect to yttrium oxide, 6 mol % to 15 mol % with respect to cerium oxide, and 5 mol % to 12 mol % with respect to calcium oxide. Above all, yttrium oxide is especially preferably used as a partial stabilizer. In this case, the content is set to preferably 2 mol % to 7 mol %, further preferably 2 mol % to 4 mol %.

For zirconium oxide into which yttrium oxide is added/contained in this range, the major crystal phase is partially stabilized in a tetragonal system or a mixed system of a cubic system and the tetragonal system, and superior substrate characteristics are given. Moreover, an average crystal particle diameter of the substrate is also important for allowing the tetragonal system to stably exist and for obtaining large substrate strength. That is, an average particle diameter is preferably 0.05 μm to 2 μm, further preferably 1 μm or less.

Moreover, the predetermined electrode films (upper and lower electrodes) 75, 77 and piezoelectric/electrostrictive layer 73 are formed on the outer surface of the substrate 68 (vibrating section 66) by various known film forming methods including thick film forming methods such as screen printing, spraying, dipping, and coating, and thin film forming methods such as ion beam, sputtering, vacuum evaporation, ion plating, CVD, and plating. It is to be noted that the films may be formed before or after sintering the substrate 68.

Moreover, the respective films (electrode films 75, 77 and piezoelectric/electrostrictive layer 73) formed on the second substrate (substrate 68) are thermally treated if necessary, and the thermal treatment may also be performed every time each film is formed, or simultaneously after all the films are formed. Furthermore, an insulating resin film may also be formed between the adjacent piezoelectric/electrostrictive layers 73, 73 if necessary in order to enhance insulation reliability between the electrode films 75, 77.

Moreover, the materials of the electrode films 75, 77 constituting the piezoelectric/electrostrictive operation section are not especially limited as long as the materials are conductors capable of bearing a high-temperature oxidation atmosphere approximately at a thermal treatment temperature and a firing temperature. For example, the material may also be a single metal or alloy, a mixture of insulating ceramic or glass with metal or alloy, or further a conductive ceramic without any problem. More preferably, electrode materials containing high-melting point noble metals such as platinum, palladium, and rhodium, or alloys such as silver-palladium, silver-platinum, platinum-palladium as main components are preferably used.

Moreover, as the material of the piezoelectric/electrostrictive layer 73 constituting the piezoelectric/electrostrictive operation section 78, any material may also be used as long as the material indicates field inductive strains such as piezoelectric and electrostrictive effects. An either crystalline or amorphous material, a semiconductor material, a dielectric ceramic material, or a ferroelectric ceramic material may also be used without any problem. Furthermore, a material which requires or does not require a polarization treatment may also be used.

Furthermore, as a piezoelectric/electrostrictive material of the present invention, there are used: a material containing lead zirconate titanate (PZT-based) as a major component a material containing lead magnesium niobate (PMN-based) as a major component; a material containing lead nickel niobate (PNN-based) as a major component; a material containing lead manganese niobate as a major component; a material containing lead antimony stannate as a major component; a material containing lead zinc niobate as a major component; a material containing lead titanate as a major component; further a composite material of these; and the like.

Moreover, materials containing oxides or other compounds of lanthanum, barium, niobium, zinc, cerium, cadmium, chromium, cobalt, strontium, antimony, iron, yttrium, tantalum, tungsten, nickel, manganese and the like as additives to the piezoelectric/electrostrictive material are sufficient such as a PLZT-based material obtained by appropriately adding a predetermined additive to the material containing PZT as a major component described above.

It is to be noted that the thickness of the piezoelectric/electrostrictive operation section comprising the electrode films 75, 77 and piezoelectric/electrostrictive film (layer) 73 formed as described above is generally 100 μm or less. The thickness of the electrode film 75 or 77 is generally 20 μm or less, preferably 5 μm or less. Furthermore, the thickness of the piezoelectric/electrostrictive film 73 is preferably 50 μm or less, further preferably 3 μm or more and 40 μm or less in order to obtain a large displacement or the like at a low operation voltage.

Additionally, since the piezoelectric/electrostrictive device 78 is formed by the film forming method, a large number of devices can be simultaneously and easily formed at minute intervals on the substrate 68 without using any adhesive by an advantage of a film forming process.

As described above, for example, as shown in FIG. 2, the separately prepared second substrate 30 can be bonded and integrated with respect to the first substrate 2 to give the micro reactor 6 of the present invention.

Figure 8:
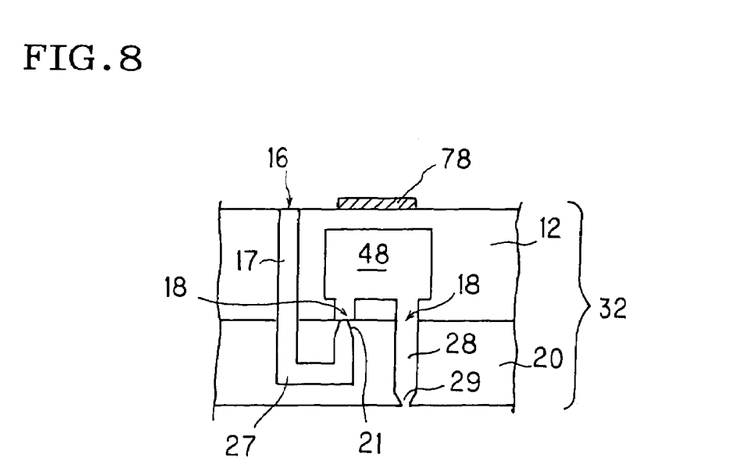
FIG. 8 is a main part enlarged sectional view showing another example of the second substrate of the present invention.

In this case, in a micro reactor according to an embodiment of the present invention, for example, as shown in FIG. 8, a second substrate 32 may also be used including at least one each of the listed members: the micro pump unit 12; and the support unit 20 including a nozzle hole 29 which adjusts an outlet shape of each micro pump 10, and flow paths 27, 28 for circulating (supplying and/or discharging) the sample in the respective micro pumps 10.

In further detail, as shown in FIG. 8, the support unit (auxiliary substrate) 20 allows a flow path 17 for circulating (supplying and/or discharging) the sample in the micro pump 10 disposed in the micro pump unit 12 to communicate with the flow path 27. Subsequently, communication holes are disposed and position right under the cavity 48 in such a manner that a portion between the flow path 27 and cavity 48, and a portion between the cavity 48 and flow path 28 are opened in the superposed surface of the support unit 20 with respect to the micro pump unit 12. Accordingly, communication is achieved like "through channel 16 -flowpath 17-flow path 27-cavity 48-flow path 28-nozzle hole 29". It is to be noted that the material of the support unit 20 of the present invention is not especially limited, but the same material as that of the micro pump unit 12 or the reactor unit (first substrate) is preferably used.

Accordingly, in the support unit 20 of the present invention, the sample can be smoothly circulated in the cavity 48. Moreover, since a solution discharge port into the first substrate 2 constitutes the nozzle hole 29, the sample can be pressurized and spouted. Moreover, the support unit 20 of the present invention has an advantage that the design change of the reactor unit can be appropriately handled only by the change of the support unit 20 without changing any specification of the micro pump unit 12.

It is to be noted that, for example, as shown in FIG. 8, a check valve 21 is preferably disposed inside the support unit 14 of the present invention in order to prevent the sample from flowing backward into the micro pump 10.

Figure 3:
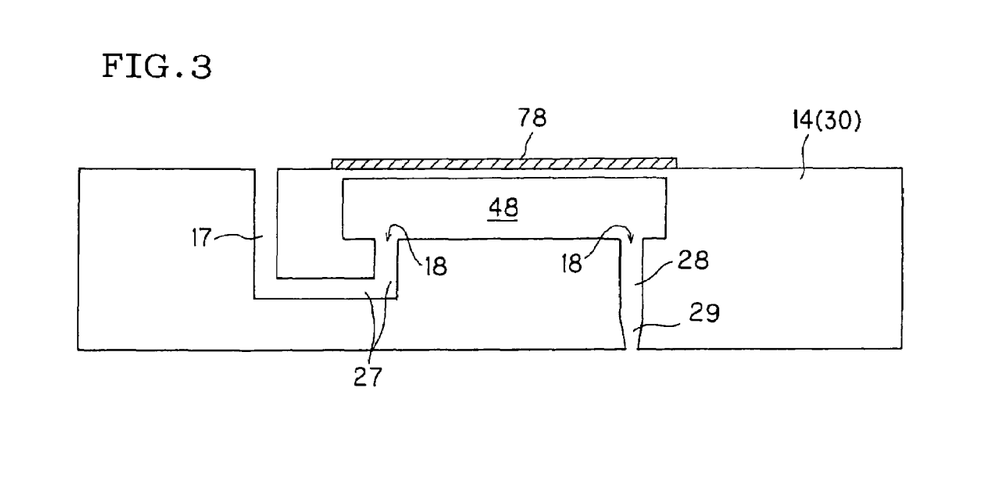
FIG. 3 is a main part enlarged sectional view showing one example of a second substrate of the present invention.

Moreover, it is assumed that in the second substrate of the present invention, for example, as shown in FIG. 3, the function of the support unit is imparted to the micro pump unit 14. Accordingly, the substrate can be formed to be compact (thinned), and is also superior in handling properties (see FIG. 2).

Furthermore, in the micro reactor of the present invention, the first substrate 2 and the second substrate 30 can be bonded to each other and integrated, for example, by the following method.

(1) An adhesive sheet is disposed between the first 2 and second 30 substrates to bond the sheets to each other via the adhesive sheet. In this case, in the method (1), an adhesive formed on a bonding surface by a screen printing process may also be used instead of the adhesive sheet. Further in the method (1), after the bonding, the ultraviolet hardening acrylic resin may also be injected in order to reinforce a bonded layer.

(2) After forming a certain gap between the first 2 and second 30 substrates by a spacer disposed between the substrates, acrylic resin is injected via a side surface to bond the substrates to each other by the use of this acrylic resin.

In this time, when a bonding area is large, a through hole is made in the substrate, and air remaining in the bonded portion is preferably liberated to the outside of the bonded portion. Moreover, in the method (2), viscosity of acrylic resin is preferably adjusted in accordance with the bonding area and material. Further in the method (2), it is preferable to select an optimum ultraviolet hardening power for hardening acrylic resin. When the power is excessively small, an excess hardening time is required. When the power is excessively large, a rapid hardening reaction occurs, and the bonded portion is sometimes cracked. It is to be noted that in the method (2), a gap for injecting the acrylic resin may also be formed by the screen printing process.

It is to be noted that a usable adhesive may be any of vinyl-based, acryl-based, polyamide-based, phenol-based, resorcinol-based, urea-based, melamine-based, polyester-based, epoxy-based, furan-based, polyurethane-based, silicone-based, rubber-based, polyimide-based, and polyolefin-based adhesives. Additionally, an adhesive having durability against the sample for use is selected.

Moreover, from a viewpoint of mass productivity, for a mode of the adhesive, coating by a dispenser is possible. Alternatively, a paste type which has a high viscosity and which can be screen-printed, or a sheet type which can be punched/processed is superior. A hot-melt adhesive type having a short heating time, or a room-temperature hardening adhesive type is more preferable. Furthermore, a high-viscosity paste type in which a filler is mixed in the original adhesive to raise viscosity is also usable.

From the above-described viewpoints and especially from a viewpoint of durability against the sample (water-based), the elastic epoxy adhesive or the silicone-based adhesive that can be screen-printed, or the polyolefin-based adhesive or the polyester-based adhesive of the sheet-shaped hot melt type that can be punched/processed is especially preferably used. It is to be noted that various adhesives described above may also be selectively applied to one part and another part of an adhesive surface.

Furthermore, in the micro reactor of the present invention, the thickness of a bonded interface portion (bonded portion) between the first substrate 2 (reactor unit) and the second substrate 30 (micro pump unit) is preferably 0.1 to 10 µm. The thickness of the bonded layer is less than 1 µm, and the layer is thin to such an extent that undulation or surface roughness of the substrate cannot be absorbed. In this case, there is a possibility that the substrates contact each other, and the bonded layer does not actually exist. Therefore, a bonding strength substantially weakens. On the other hand, when the thickness of the bonded layer exceeds 10 µm, and even when rigidity of ceramic is high, but when the bonded layer is soft and thick, the pressure is absorbed. It is to be noted that in general, for the bonding, the bonded layer is preferably thinner (at a time when the substrate is an ideal plane). Since the strength of the bonded layer is originally lower than that of the substrate, the layer is preferably omitted if possible. Therefore, with the use of the bonded layer, it is indispensable to form the layer as thin (small) as possible and to avoid breakage from the bonded layer.

EXAMPLES

The present invention will be described hereinafter in more detail in accordance with examples, but the present invention is not limited to these examples.

Example

As shown in FIG. 1, a micro reactor having a length: 20 mm×width: 15 mm×thickness: 3 mm and using the second substrate 30 on which twelve unit reactors 1 were formed was manufactured based on a manufacturing method of the present invention. Here, as shown in FIG. 2, the unit reactor 1 includes three micro pumps 10 of the ceramic integral type, the respective pumps are connected to one reactor 6 via the flow paths 5, 7 (flow path width: 50 µm), and the sample is supplied and recovered. Next, a basic performance of the obtained micro reactor was evaluated.

Comparative Example

Figure 9:
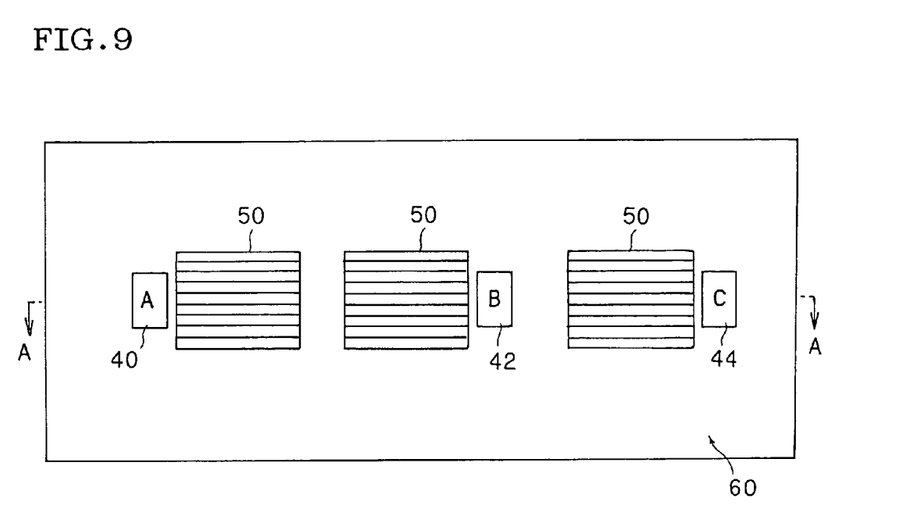
FIG. 9 is a front view showing one example of the micro reactor of the present invention.
Figure 10:
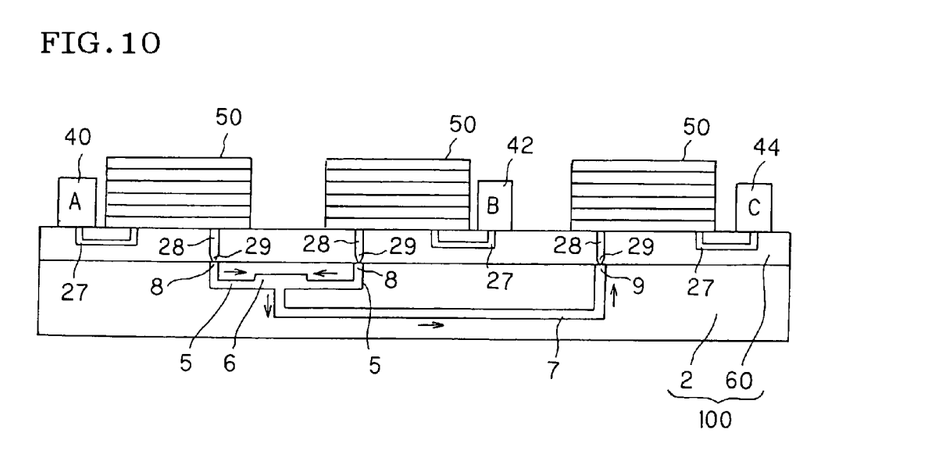
FIG. 10 is an A-A sectional view of FIG. 9.

As shown in FIG. 9, a micro reactor having a length: 10 mm×width: 30 mm×thickness: 3 mm, on which one unit reactor 100 was formed, was manufactured by the existing manufacturing method. Here, as shown in FIG. 10, the unit reactor 100 includes three diaphragm pumps 50, the respective pumps are connected to one reactor 6 via the flow paths 5, 7 (flow path width: 50 µm), and the sample is supplied and recovered. Next, the basic performance of the obtained micro reactor was evaluated.

DISCUSSION

In the example, as shown in FIG. 1, as compared with the comparative example (see FIG. 9), a degree of integration of micro pumps 10, that is, unit reactors per unit area is very high, and cost performance is superior. Additionally, the micro pump 10 was appropriately connected or disconnected in accordance with the design of the reactor unit in the first substrate 2, and accordingly it was possible to easily prepare various reaction system micro reactors.

As described above, in the micro reactor of the present invention, a plurality of micro pumps superior in discharge force into the channel (flow path) and capable of instantaneously controlling the feeding/receiving of the solution with precise accuracy can be integrated. Moreover, a micro pump unit 14 in which the integrated micro pumps 10 are integrally formed, and the reactor unit in the first substrate 2 mainly including the channel 5, 7 (flow path), reactor 6 (reaction vessel), injection port 8, and discharge port 9 are separately manufactured, and bonded to each other, so that the micro reactor is superior in productivity and versatility.

What is claimed is:
1. A micro reactor comprising:
a first substrate comprising
a predetermined number of elongated reactors,
at least two corresponding micro channels connected to each reactor at respective connection points,
at least one injection port corresponding to each reactor, the injection port feeding/receiving a sample solution to said reactor and being disposed at an end of one of the corresponding micro channels or the reactor connected to the corresponding micro channels, and
at least one discharge port corresponding to each reactor, the discharge port recovering the sample solution after a reaction in the reactor, the discharge port being disposed in one of the corresponding micro channels or the reactor connected to the corresponding micro channels; and
a second substrate comprising:
at least one micro pump being integrally formed therein, said micro pump comprising a cavity defined by an inner surface of the substrate, an inlet associated with the cavity, and a piezoelectric operation section formed on an outer surface of the substrate, the piezoelectric operation section including an electrode and a piezoelectric layer formed on an outer surface of the substrate, an injection connection port for feeding the sample solution to the injection port, and a discharge connection port for receiving the sample solution from the discharge port, wherein the first substrate and the second substrate are integrally bonded in such a manner that the injection connection port and the discharge connection port of the second substrate align with the injection port and the discharge port of the first substrate, respectively, and wherein a pressure generated in the cavity by the piezoelectric operation section moves the sample solution through the reactor, and wherein the micro pump is associated with one of the injection connection port and the discharge connection port.

2. The micro reactor according to claim 1, wherein the number of micro pumps disposed in the second substrate is greater than two for each reactor.

3. The micro reactor according to claim 1, wherein the second substrate comprises at least two micro pumps fluidly connected to one another through micro channels in the first substrate.

4. The micro reactor according to claim 1, wherein the second substrate is bonded to at least a portion of the first substrate.

5. The micro reactor according to claim 1, further comprising a bonded interface portion located between the first and second substrates, the bonded interface portion having a thickness in a range of 0.1 to 10 μm.

6. The micro reactor according to claim 1, wherein a material of the first substrate is a plastic, and a material of the second substrate is a ceramic.

7. The micro reactor according to claim 1, wherein materials of the first and second substrates are ceramic.

* * * * *